(12) United States Patent
Klicpera et al.

(10) Patent No.: US 12,254,377 B1
(45) Date of Patent: Mar. 18, 2025

(54) IMAGING DEVICE WITH IMPROVED LAMP MODE

(71) Applicant: ZEBRA TECHNOLOGIES CORPORATION, Lincolnshire, IL (US)

(72) Inventors: Christopher P. Klicpera, Westbury, NY (US); Jason Y. Potter, New York, NY (US); Mathew G. Locoteta, Shoreham, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/621,046

(22) Filed: Mar. 28, 2024

(51) Int. Cl.
  *G06K 7/10* (2006.01)
  *G01P 15/18* (2013.01)
  *G06K 7/04* (2006.01)

(52) U.S. Cl.
  CPC .......... *G06K 7/10732* (2013.01); *G01P 15/18* (2013.01); *G06K 7/04* (2013.01)

(58) Field of Classification Search
  CPC .. G06K 7/04; G06K 7/10564; G06K 7/10574; G06K 7/10584
  USPC ..... 235/462.42, 462.41, 462.24, 462.11, 375
  See application file for complete search history.

(56) References Cited

U.S. PATENT DOCUMENTS

2022/0232138 A1* 7/2022 Gao .................. H04N 1/02815

\* cited by examiner

*Primary Examiner* — Edwyn Labaze
(74) *Attorney, Agent, or Firm* — Yuri Astvatsaturov

(57) ABSTRACT

Systems and methods for providing an improved lamp mode for an imaging device. The imaging device may include an image sensor; an illumination source; and a processing assembly communicatively coupled to the image sensor and the illumination source, and the processing assembly may be configured to: responsive to a scanning event trigger, cause the imaging device to enter a first illumination mode, wherein, in the first illumination mode, a first activation duration of the illumination source is synchronized with an image frame rate of the image sensor to capture image data at the image sensor for indicia decoding; and responsive to sensing an external signal at the imaging device, cause the imaging device to enter or exit a second illumination mode, wherein, in the second illumination mode, a second activation duration of the illumination source is greater than the first activation duration.

20 Claims, 9 Drawing Sheets

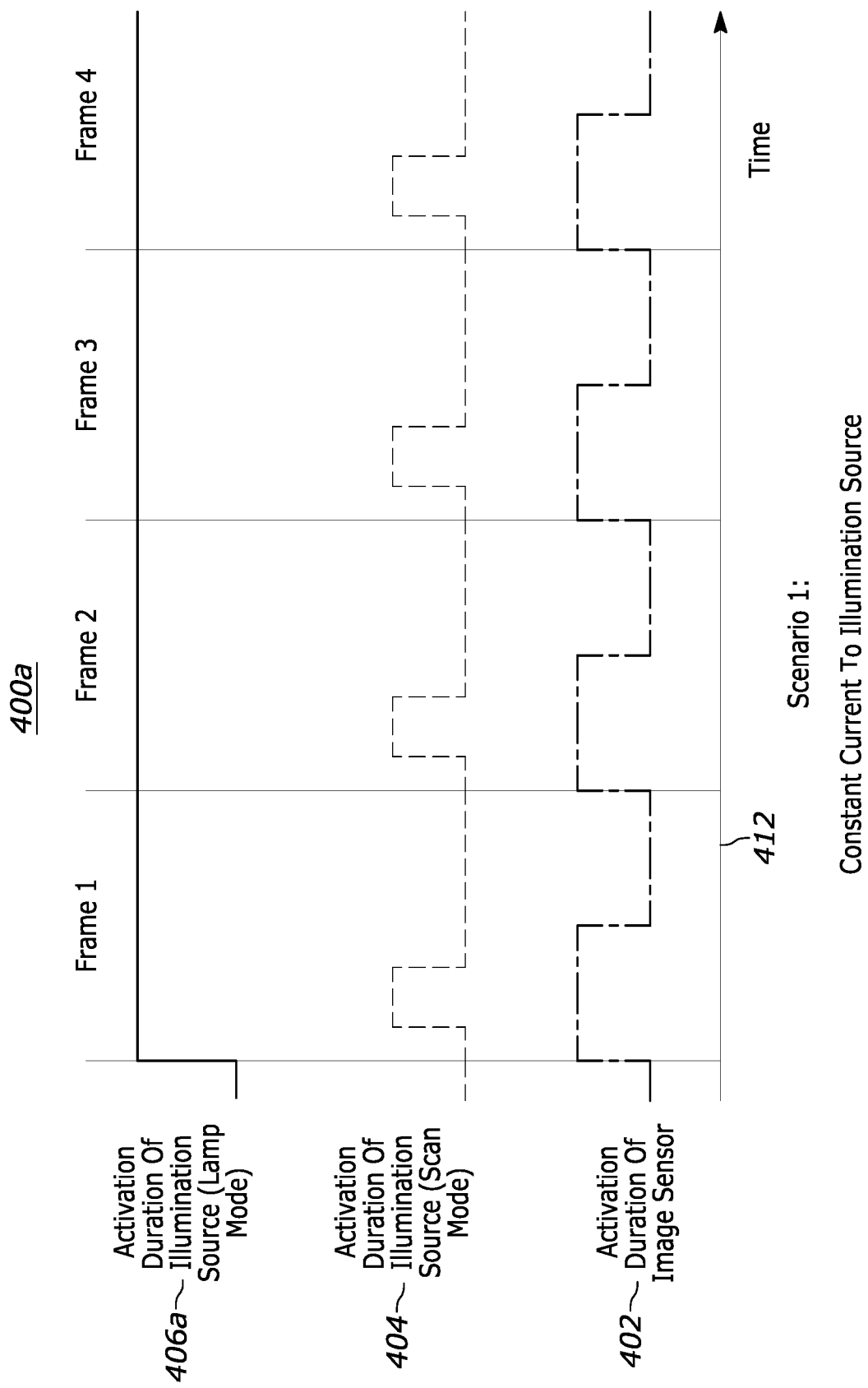

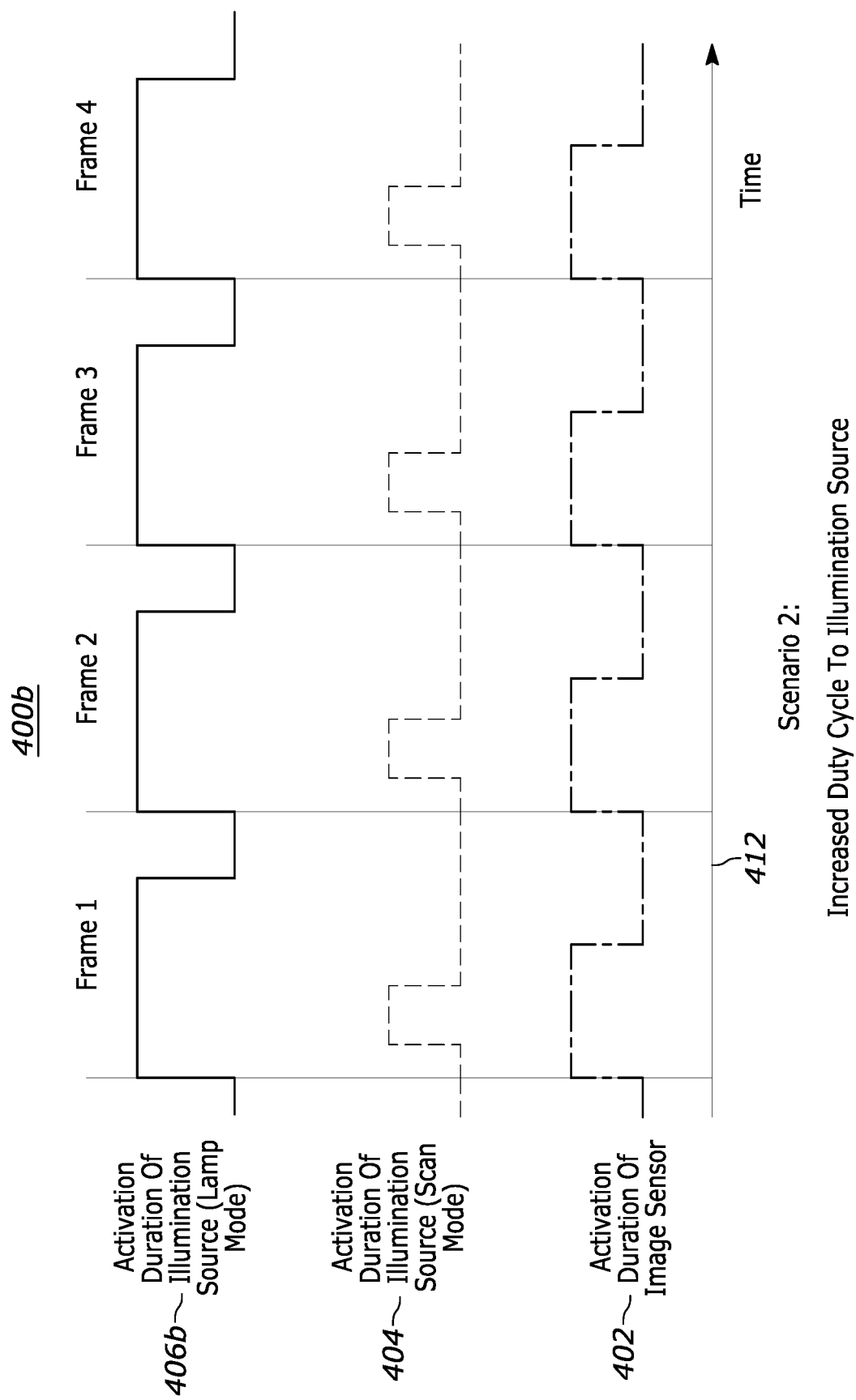

IMAGING DEVICE WITH IMPROVED LAMP MODE

BACKGROUND

Typical barcode imaging devices, such as handheld barcode readers, point of sale scanners, and direct part marking scanners, require proper illumination of targets to obtain high quality, low-blur images to decode barcodes in the images. In various imaging devices, the illumination source (e.g., a light emitting diode (LED) source) is essential for decoding of barcodes in captured images, given that various factors such as time of day, direction of illumination, illumination intensity, and light type or light source type all may affect how effective a system is in decoding barcodes. However, in various imaging devices, these illumination sources have been used for the additional purpose of providing task lighting during operation.

Various cordless imaging devices use their illumination sources in a "lamp mode" in which the illumination source is switched on for task lighting while the imaging device is docked in a presentation cradle. The lamp mode is initiated by pressing a paging (or other) button on a presentation cradle, while the imaging device is docked, thereby generating an illumination beam over an operating range. Typically, while in lamp mode, the imaging device is still capable of reading barcodes—a dual-operation approach.

However, a side effect of this dual-operation approach is that the illumination beam from the imaging device pulses at a frame rate that generates a perceptible flicker. This pulsing induces annoying strobing effects on motion related to the task performed under the illumination and is energy inefficient. Yet, if the illumination source (e.g., LEDs) were driven with constant current to avoid this flicker, then both functions of the illumination source would be impacted. For example, if a constant current were driven through the illumination source and no other changes were made to the current, voltage, or power across the illumination source (e.g., a constant current of 750 milliamps (mA) with a voltage of 12 volts (V) creating a power load of 9 watts (W) across the illumination source), then the resulting light emitted from the illumination source would be too bright to perform tasks and would exceed eye safety limits. Conversely, if a constant current were driven through the illumination source and the illumination source was dimmed by reducing current, voltage, or power across the illumination source (e.g., a constant current of 75 mA with a voltage of 12 V creating a power load of 0.9 W), then images taken for scanning would be too dark to accurately detect indicia.

There is a need for imaging devices with improved lamp modes.

SUMMARY

The present invention relates generally to an improved lamp mode of an imaging device. In a first embodiment, the imaging device may include an image sensor; an illumination source; and a processing assembly communicatively coupled to the image sensor and the illumination source, and the processing assembly may be configured to: responsive to a scanning event trigger, cause the imaging device to enter a first illumination mode, wherein, in the first illumination mode, a first activation duration of the illumination source is synchronized with an image frame rate of the image sensor to capture image data at the image sensor for indicia decoding; and responsive to sensing an external signal at the imaging device, cause the imaging device to enter or exit a second illumination mode, wherein, in the second illumination mode, a second activation duration of the illumination source is greater than the first activation duration.

In a variation of the current embodiment, the second activation duration is a constant duration. In another variation of the current embodiment, the second activation duration has a greater duty cycle than the first activation duration. In yet another variation of the current embodiment, the second activation duration has a greater number of activations than the first activation duration.

In another variation of the current embodiment, visible light emitted from the illumination source during the second activation duration is dimmer than during the first activation duration.

In another variation of the current embodiment, a mechanical trigger with a pressure sensor may be communicatively coupled to the processing assembly, the scanning event trigger is a user pressing on the mechanical trigger to engage the pressure sensor, and the imaging device remains in the first illumination mode until (i) the imaging device decodes an indicia in image data captured by the image sensor or (ii) the user releases the mechanical trigger.

In another variation of the current embodiment, a proximity sensor may be communicatively coupled to the processing assembly, the scanning event trigger may be a detection of an object by the proximity sensor, and the imaging device remains in the first illumination mode until (i) the imaging device decodes an indicia in image data captured by the image sensor or (ii) the proximity sensor no longer detects the object.

In another variation of the current embodiment, the imaging device may further include a mechanical input component, the mechanical input component may be one of (a) a switch, (b) a button, or (c) a dial, and the external signal may be a user engaging the mechanical input component.

In another variation of the current embodiment, the imaging device may further include an accelerometer, the accelerometer may be communicatively coupled to the processing assembly, and the external signal may be an acceleration detected by the accelerometer that exceeds a threshold acceleration.

In another variation of the current embodiment, the imaging device may further include an accelerometer and a machine learning model, and the accelerometer may be communicatively coupled to the processing assembly, the machine learning model may be executed by the processing assembly for outputting a determination of whether the imaging device should enter or exit the second illumination mode based on a detected acceleration of the imaging device, the machine learning model may be trained on a plurality of training accelerations, an acceleration may be detected by the accelerometer is input into the machine learning model, a determination to enter or exit the second illumination mode may be outputted by the machine learning model, and the external signal is the determination.

In a second embodiment, a computer-readable method may include responsive to a scanning event trigger, switching, by a processing assembly of an imaging device, on a first illumination mode of the imaging device, wherein, in the first illumination mode, a first activation duration of an illumination source of the imaging device is synchronized with an image frame rate of an image sensor of the imaging device to capture image data at the image sensor for indicia decoding; and responsive to receiving an external signal at the imaging device, switching, by the processing assembly of the imaging device, on a second illumination mode of the imaging device, wherein, in the second illumination mode, a second activation duration of the illumination source is greater than the first activation duration.

In a variation of the current embodiment, the second activation duration is a constant duration. In another variation of the current embodiment, the second activation duration has a greater duty cycle than the first activation duration. In yet another variation of the current embodiment, the second activation duration has a greater number of activations than the first activation duration.

In another variation of the current embodiment, visible light emitted from the illumination source during the second activation duration is dimmer than during the first activation duration.

In another variation of the current embodiment, the scanning event trigger may be a user pressing on a mechanical trigger of the imaging device to engage a pressure sensor, and the imaging device remains in the first illumination mode until (i) the imaging device decodes an indicia in image data captured by the image sensor or (ii) the user releases the mechanical trigger.

In another variation of the current embodiment, the scanning event trigger may be a detection of an object by a proximity sensor of the imaging device, and the imaging device remains in the first illumination mode until (i) the imaging device decodes an indicia in image data captured by the image sensor or (ii) the proximity sensor no longer detects the object.

In another variation of the current embodiment, the external signal is a user engaging a mechanical input component of the imaging device, and the mechanical input component may be one of (a) a switch, (b) a button, or (c) a dial.

In another variation of the current embodiment, the external signal may be a detection, by an accelerometer of the imaging device, of an acceleration that exceeds a threshold acceleration.

In another variation of the current embodiment, the method may further include training, by one or more processors, a machine learning model deployed on the imaging device, the machine learning model trained to output a determination of whether the imaging device should switch on the second illumination mode of the imaging device based on a detected acceleration of the imaging device; detecting, by an accelerometer of the imaging device, an acceleration of the imaging device; inputting, by the processing assembly of the imaging device, the detected acceleration into the machine learning model, and outputting, by the machine learning model, a determination to switch on the second illumination mode of the imaging device, wherein the external signal is determination.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 4A is a graph of an example activation duration of an illumination source of the imaging device under an improved lamp mode.

FIG. 4B is a graph of another example activation duration of an illumination source of the imaging device under an improved lamp mode.

Figure 1A:
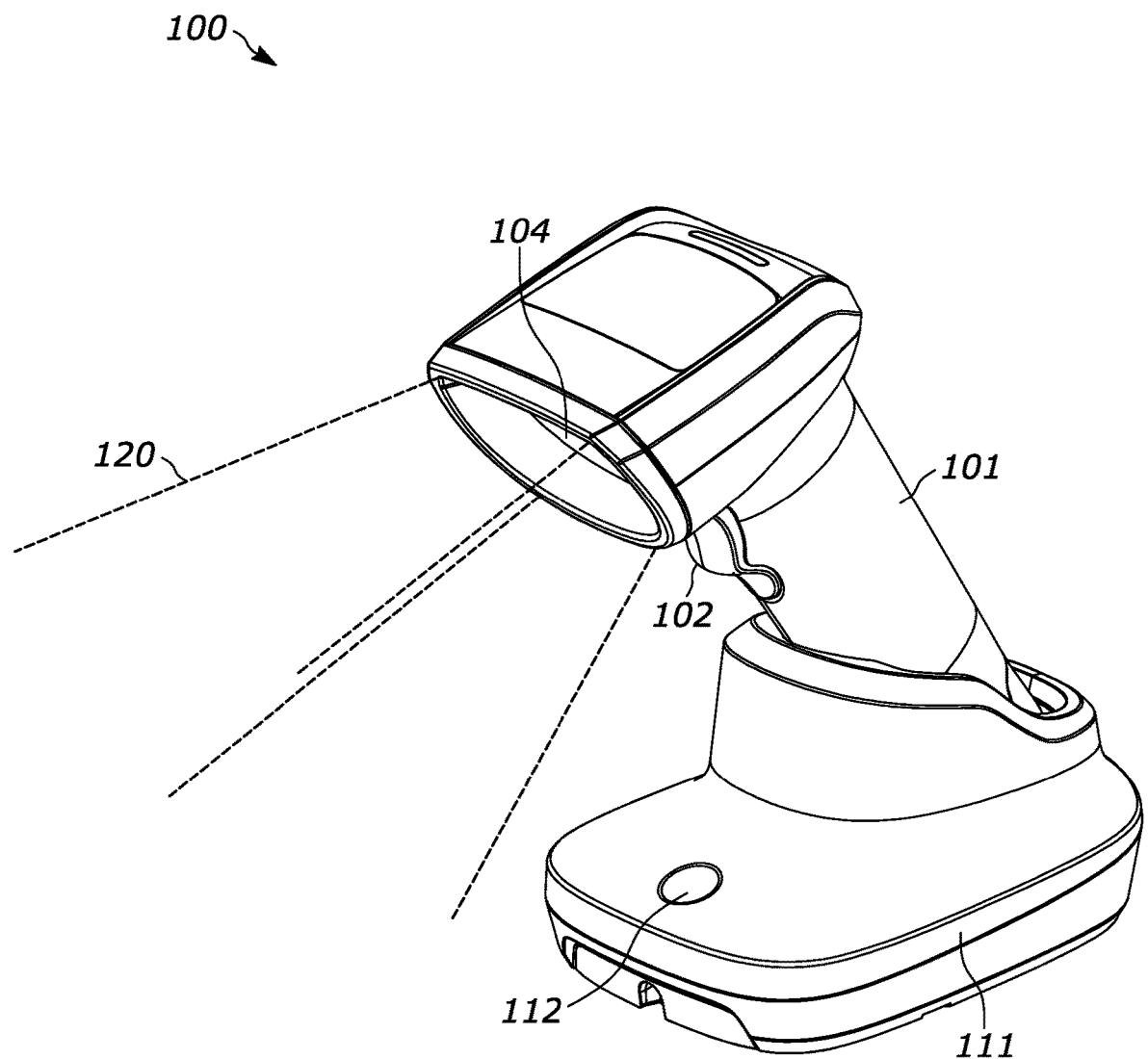
FIG. 1A illustrates a perspective view of an example handheld imaging device with an improved lamp mode docked in a presentation cradle.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Imaging devices, such as cordless handheld barcode readers, include internal illumination sources that will illuminate objects in a field of view to obtain high-quality, low-blur images that allow for faster decoding of indicia (e.g., barcodes, QR codes, etc.) captured in the image data. A subset of these imaging devices provide further operations of the illumination sources, namely, in the form of a "lamp mode" in which the illumination source is maintained on to emit visible light for task lighting, separate from the barcode scanning. For example, conventional imaging devices enter a "lamp mode" when the imaging device is placed in a cradle (or other base) and a trigger button, such as a paging button, is depressed. This allows a user to control entry into the lamp mode, but only when the imaging device is presumptively positioned in a location, at height, and in directed orientation, where the illumination from the lamp mode will not enter a user's eye or that of someone nearby.

To address the issues of conventional imaging devices outlined above, an improved lamp mode of imaging devices is provided herein. In particular, while the imaging device is set to the improved lamp mode, one or more of the illumination settings (e.g., activation duration, brightness, duty cycle, etc.) of the illumination source will be set to a different value than when the imaging device is actively scanning. While the imaging device is actively scanning (e.g., either by detecting an object from a proximity sensor or via from activation of a user), lamp mode is suspended for the duration of the scan.

Further, in accordance with the present teachings, imaging devices that offer the improved lamp mode also include one or more controls of the lamp mode, thereby providing more effective switching between "ON" and "OFF" states of the lamp mode. For example, in some embodiments, the imaging device may include one or more buttons, dials, switches, and or other agnostic mechanical components that allow a user to switch between the "ON" and "OFF" states of the lamp mode. Additionally or alternatively, in some embodiments, the imaging device may include one or more object detection sensors that can provide further override of this switching between the "ON" and "OFF" states of the lamp mode. For instance, the imaging device may be equipped with an accelerometer and/or one or more algorithms for determine when the body of the imaging device is tapped by the user to switch between the "ON" and "OFF" states of the lamp mode.

In these ways, the imaging devices herein achieve a more efficient operation of the illumination sources within imaging devices. In various examples, improved lamp modes described herein provide a task light that (1) is neither too bright nor too dim and has no strobing effect, (2) does not negatively impacting scanning capabilities, and (3) is not energy inefficient. Both user-controlled switching of the lamp mode is provided, as well as object detection based switching, the latter can further provide control of the pulsed operation of the illumination source. In addition, the improved lamp mode no longer requires the imaging device to be docked in a presentation cradle, allowing for users to position and orient the barcode scanner in any way that is most convenient for them.

Figure 1B:
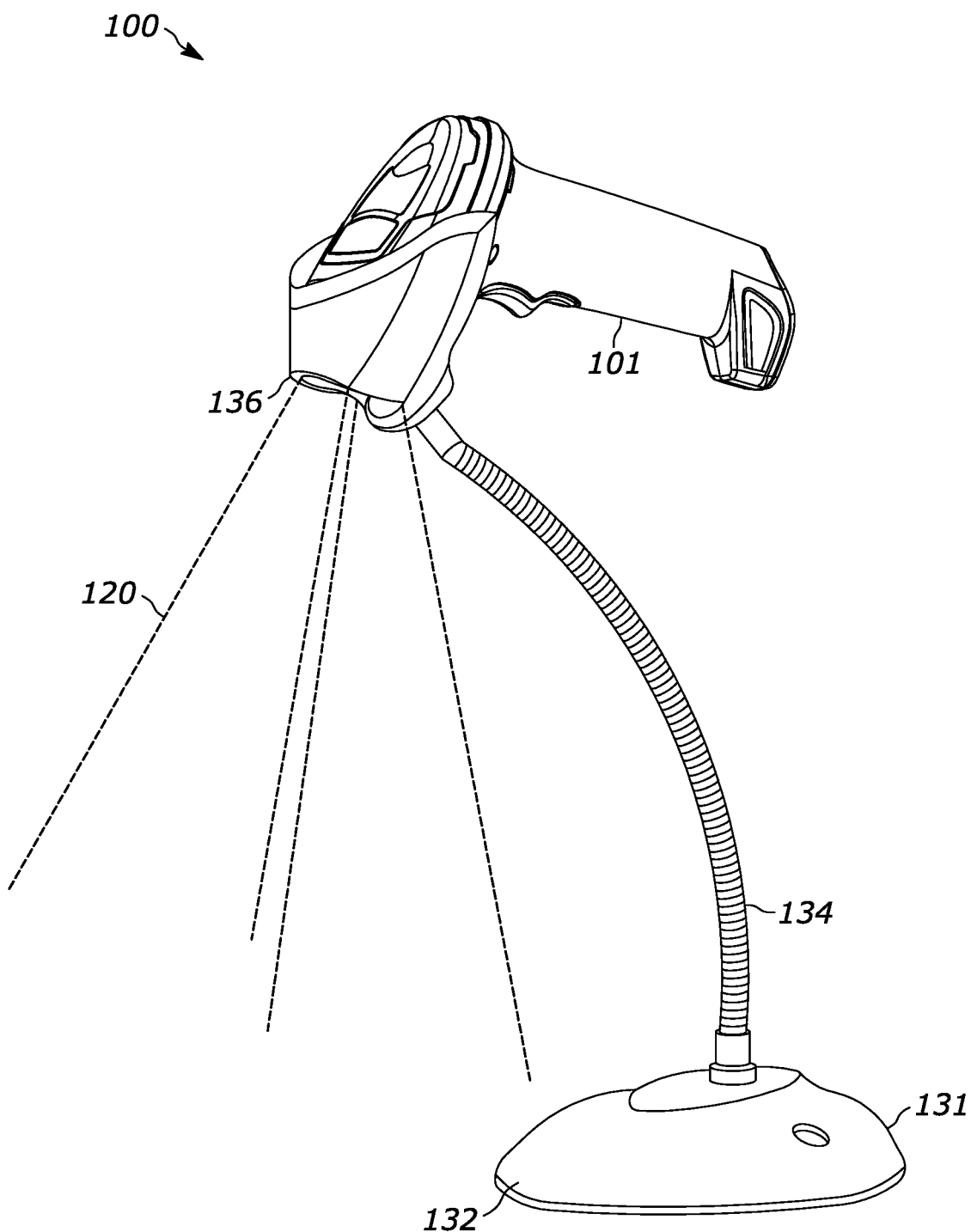
FIG. 1B illustrates another perspective view of an example handheld imaging device with an improved lamp mode docked in a desk mount.

FIGS. 1A and 1B illustrate perspective views of an example handheld imaging device 100 in accordance with the teachings of this disclosure.

Figure 2:
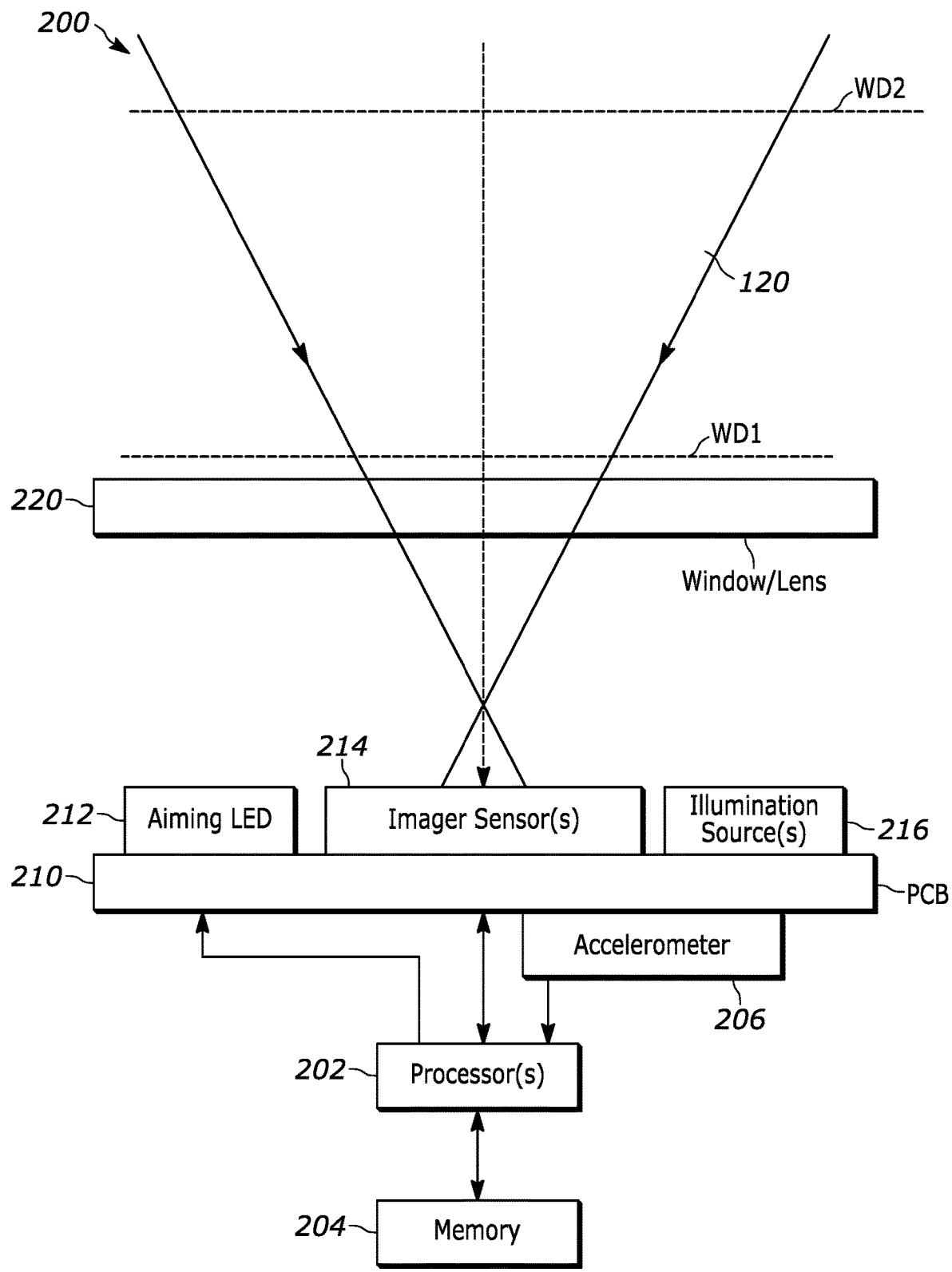
FIG. 2 illustrates a connecting diagram of a system implementing an improved lamp mode.

The imaging device 100 may be referred to as an indicia reader. In the examples shown, the imaging device 100 includes a housing having a handle or a lower housing portion 101, a trigger 102, and an optical imaging assembly 104 that includes one or more image sensors and one or more illumination sources (such as the image sensor(s) 214 and the illumination source(s) 216 as illustrated in FIG. 2). The optical imaging assembly 104 is at least partially positioned within the housing and has a field of view (FOV) 120, and the optical imaging assembly 104 includes an optically transmissive window and/or lens(es) (such as the window and/or lens(es) 220 as illustrated in FIG. 2). In the examples shown, the housing and internal components of the imaging device 100 may be the same imaging device 100 across both FIGS. 1A and 1B.

In some embodiments, as illustrated in FIG. 1A, the imaging device 100 may further include a presentation cradle 111. The presentation cradle 111 may include a mechanical input component 112 (e.g., a button, a dial, a switch, etc.) to allow the user to switch the imaging device 100 between the "ON" and "OFF" states of the lamp mode.

Additionally or alternatively, in some embodiments, as illustrated in FIG. 1B, the imaging device 100 may further include a mount 131. The mount 131 may have a base 132 where it is attached to an anchor point (e.g., a desk, cart, wall, etc.) as well as a contouring neck 134 and an attachment point 136 for the imaging device 100.

The one or more image sensors of the optical imaging assembly 104 may include a plurality of photo-sensitive elements. The photo-sensitive elements may be arranged in a pattern and may form a substantially flat surface. For example, the photo-sensitive elements may be arranged in a grid or a series of arrays forming a 2D surface. The one or more image sensors of the optical imaging assembly 104 may have an imaging axis that extends through the window and/or lens. Further, the one or more image sensors may include one or more global shutter sensors.

While the imaging device 100 illustrated herein is shown having a single FOV 120, the imaging device 100 may have a plurality of FsOV. Accordingly, the optical imaging assembly 104 may include a plurality of illumination sources and associated optics with each respective illumination source providing radiation to a respective FOV with the illumination indicative of the size, shape, and position of the respective FOV. Further, the optical imaging assembly 104 may include a plurality of aiming radiation sources and associated optics that provide aiming radiation in the form of an aiming pattern, with each respective aiming radiation source providing the aiming pattern to a respective FOV of the imaging device 100.

To operate the imaging device 100, a user may engage the trigger 102 thereby triggering an internal pressure sensor and, thus, causing the imaging device 100 to capture an image of an object. Additionally or alternatively, in some examples, the imaging device 100 may be set to a scan mode to capture an image of the object. For example, in scan mode, the imaging device may wait until the one or more sensors of the optical imaging assembly 104 (such as the proximity sensor 212 as illustrated in FIG. 2) are triggered (e.g., by the detection of an object within the range of the proximity sensor 212). Once either the trigger 102 is depressed or the one or more sensors are triggered, the imaging device may capture the image and initiate an identification session in response to the target being identified. The identification session may be terminated in response to a lack of targets in the FOV 120.

In some embodiments, the imaging device 100 may be fully handheld and cordless, capable of entering scan mode without being docked in a presentation cradle 111 as illustrated in FIG. 1B. In these embodiments, the imaging device 100 may be attached to the mount 131 which in turn may be attached to a desk, cart, wall, etc. and contorted to orient the imaging device 100 in a way that is most convenient to the user.

FIG. 2 illustrates a block connection diagram of a system 200 (e.g., the components of the imaging device 100) implementing an improved lamp mode, in accordance with an example. The system 200 may have one or more processors 202 and one or more memories 204 storing computer executable instructions to perform operations associated with the systems and methods as described herein. In some embodiments, the one or more processors 202 and the one or more memories 204 may be communicatively coupled to each other (e.g., via a dedicated communication bus) and integrated onto a printed circuit board (PCB) 210.

The system 200 may also include an accelerometer 206, a proximity sensor 212, imaging sensor(s) 214, and illumination source(s) 216. The accelerometer 206, the proximity sensor 212, the imaging sensor(s) 214, and the illumination source(s) 216 may all be connected to the PCB 210 such that they are communicatively coupled to the one or more processors 202. While a proximity sensor 212 is depicted in FIG. 2, it should be noted that additional and/or alternative sensors for detecting objects at a distance, weight, motion, and the like are contemplated for other types of imaging devices 100 (e.g., lidar, a weight sensor, a motion sensor, etc.).

In some embodiments, the imaging sensor(s) 214 may have a one-dimensional array of addressable image sensors or pixels arranged in a single row, or a two-dimensional array of addressable image sensors or pixels arranged in mutually orthogonal rows and columns, and operative for detecting return light captured by the imaging sensor(s) 214 over a FOV 120 through a window and/or lens 220. The imaging sensor(s) 214 may also include and/or function as a monochrome sensor and, in further implementations, a color sensor. Depending on the implementation, imaging sensor(s) 214 may include a color sensor such as a vision camera in addition to and/or as an alternative to the monochrome sensor. In some implementations, the imaging sensor(s) 214 is or includes a barcode reading module (e.g., a monochromatic imaging sensor). In further implementations, the imaging sensor(s) 214 additionally or alternatively is or includes a vision camera (e.g., a color imaging sensor). It will be understood that, although imaging sensor(s) 214 is depicted in FIG. 2 as a single block, that imaging sensor(s) 214 may be multiple sensors spread out in different locations of the system 200.

As depicted in FIG. 2, return light is scattered and/or reflected from an object over the FOV 120. The light that impinges on the pixels is sensed and the output of those pixels produce image data that is associated with the environment that appears within the FOV 120 (which can include the object). This image data is typically processed by the one or more processors 202 (usually by being sent to a decoder) which identifies and decodes decodable indicia captured in the image data. Once the decode is performed successfully, the reader can signal a successful "read" of the object (e.g., a barcode). The object may be located anywhere in a working range of distances between a close-in working distance (WD1) and a far-out working distance (WD2). In an implementation, WD1 is about one-half inch from the window and/or lens 220, and WD2 is about thirty inches from the window and/or lens 220.

An illuminating light assembly may also be mounted in, attached to, or associated with the system 200. The illuminating light assembly may include illumination source(s) 216, such as at least one light emitting diode (LED) and at least one illumination lens (not shown), and preferably a plurality of illumination and illumination lenses, configured to generate a substantially uniform distributed illumination pattern of illumination light on and along the object to be imaged by image capture. Although FIG. 2 illustrates a single illumination source(s) 216, it will be understood that the illumination source(s) 216 may include more light sources. At least part of the scattered and/or reflected return light is derived from the illumination pattern of light on and along the object.

The imaging sensor(s) 214 and the illumination source(s) 216 are operatively connected to the one or more processors 202 (e.g., a microprocessor facilitating operations of the other components of the system 200) which is operative for controlling the operation of these components. In some embodiments, the one or more processors 202 functions as, or is communicatively coupled to, a vision application processor for receiving, processing, and/or analyzing the image data captured by the imaging sensor(s) 214.

In some embodiments, the one or more processors 202 are the same as the one used for processing the captured return light from the illuminated object to obtain data related to the object. Though not shown, additional optical elements, such as collimators, lenses, apertures, compartment walls, etc. may be provided in the system 200. Although FIG. 2 shows the proximity sensor 212, the imaging sensor(s) 214, and the illumination source(s) 216 as being mounted on the same PCB 210, it should be understood that different implementations of the system 200 may have these components each on a separate PCB, or in different combinations on separate PCBs. For example, in an implementation of the system 200, the illumination LED source is provided as an off-axis illumination (i.e., has a central illumination axis that is not co-axial with the central FOV axis).

The system 200 may be configured to operate in two modes, as described herein. For example, when operating in a first mode, e.g., the scan mode, the illumination properties of the illumination source(s) 216 may be set to a first setting (e.g., a pulsing current of 750 mA, a duty cycle of about 9%, and a single activation of the illumination source(s) 216). In a second mode, e.g., the lamp mode, the illumination properties of the illumination source(s) 216 may be set to a second setting (e.g., (1) the current may be changed to a constant current of 75 mA, (2) the duty cycle may be changed to a duty cycle of about 9%-100%, and/or (3) the number of activations per each 16.67 ms frame may be increased to two-four activations). In this way, the illumination source(s) 216 may be optimized for the dual-operational purposes of the illumination source(s). With the illumination properties set to scan mode, the imaging sensors 214 can capture images that are not dim, not oversaturated, and with minimal blurring. Conversely, with the illumination properties set to lamp mode, the illumination source(s) 216 do not appear to be brighter than while in scan mode, they are more energy efficient, and they will not run the risk of overheating.

In some embodiments, the accelerometer 206 may work in conjunction with a processor (e.g. the one or more processors 202) to determine whether to set the lamp mode of the imaging device 100 to "ON" and/or "OFF." In these embodiments, accelerometer 206 may detect of an acceleration (e.g., resulting a user striking the housing of the imaging device 100). In these embodiments, if the detected acceleration exceeds a threshold acceleration, then the lamp mode may be turned "ON" or "OFF."

Additionally or alternatively, in some embodiments, the lamp mode may be switched "ON" and/or "OFF" based upon a determination made by a machine learning model (a "ML model" or an "AI model"), for example stored in the memory 204. In these embodiments, the ML model may be trained and verified using a set of training data that includes a set of correlations between accelerations and determinations. For instance, patterns in the training data may reveal a pattern between acceleration and determinations (e.g., two quick jerks in succession may be associated with switching the lamp mode "ON" and/or "OFF" and an acceleration with a fairly small derivative may be associated with not switching the lamp mode "ON" and/or "OFF") such that the model may be able to make accurate determinations on new accelerations not found in the training data. Once the ML model has been trained and verified, it may be deployed on the one or more processors 202, and any detected accelerations from the accelerometer 206 may be used as an input for the ML model. The ML model may then make, as an output, a determination to either switch "ON" and/or "OFF" the lamp mode.

Figure 3:
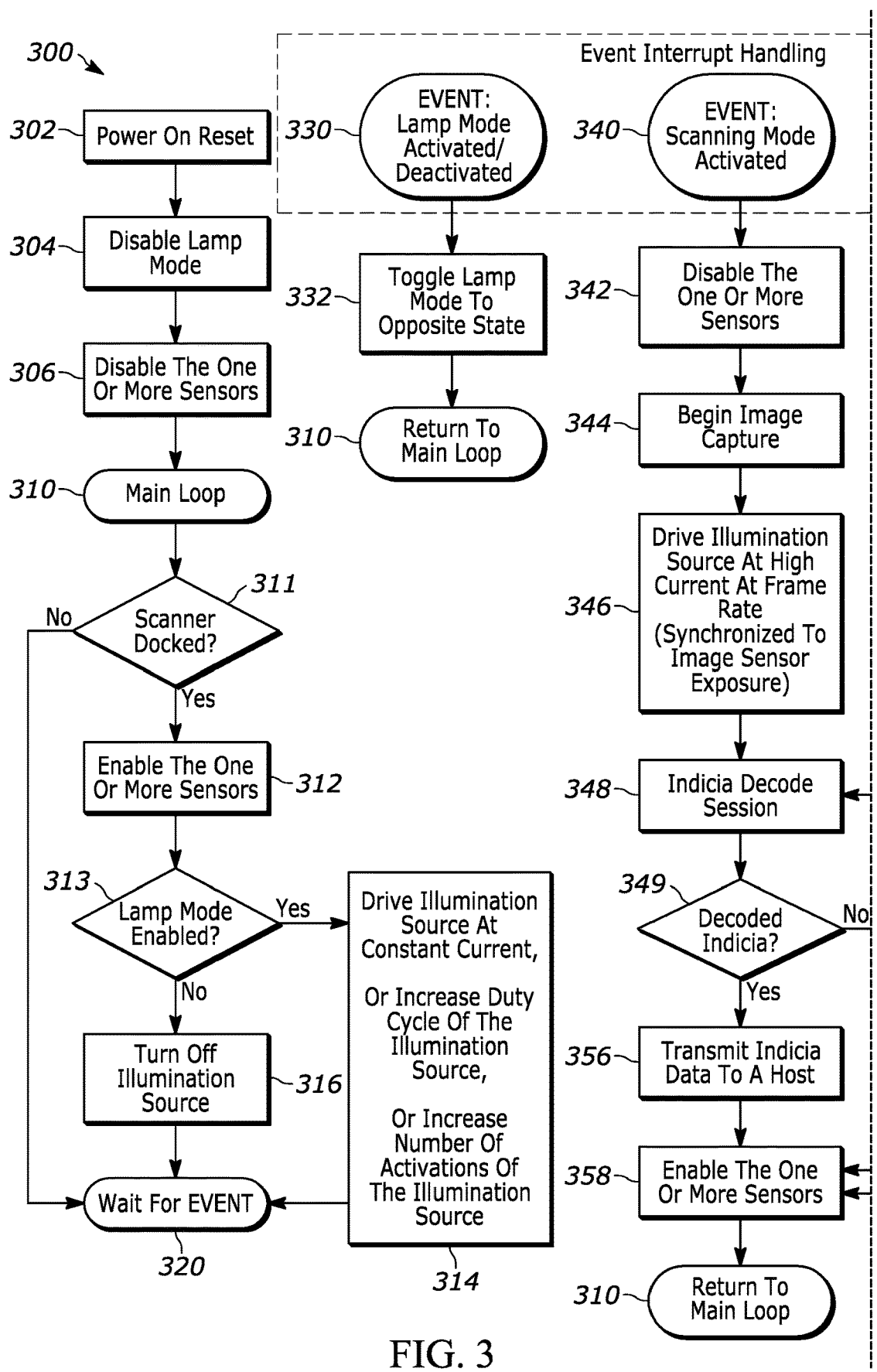
FIG. 3 illustrates a flow diagram of an implementation of an improved lamp mode as may be performed by an imaging device in FIGS. 1A and 1B and/or the system in FIG. 2.
Figure 3:
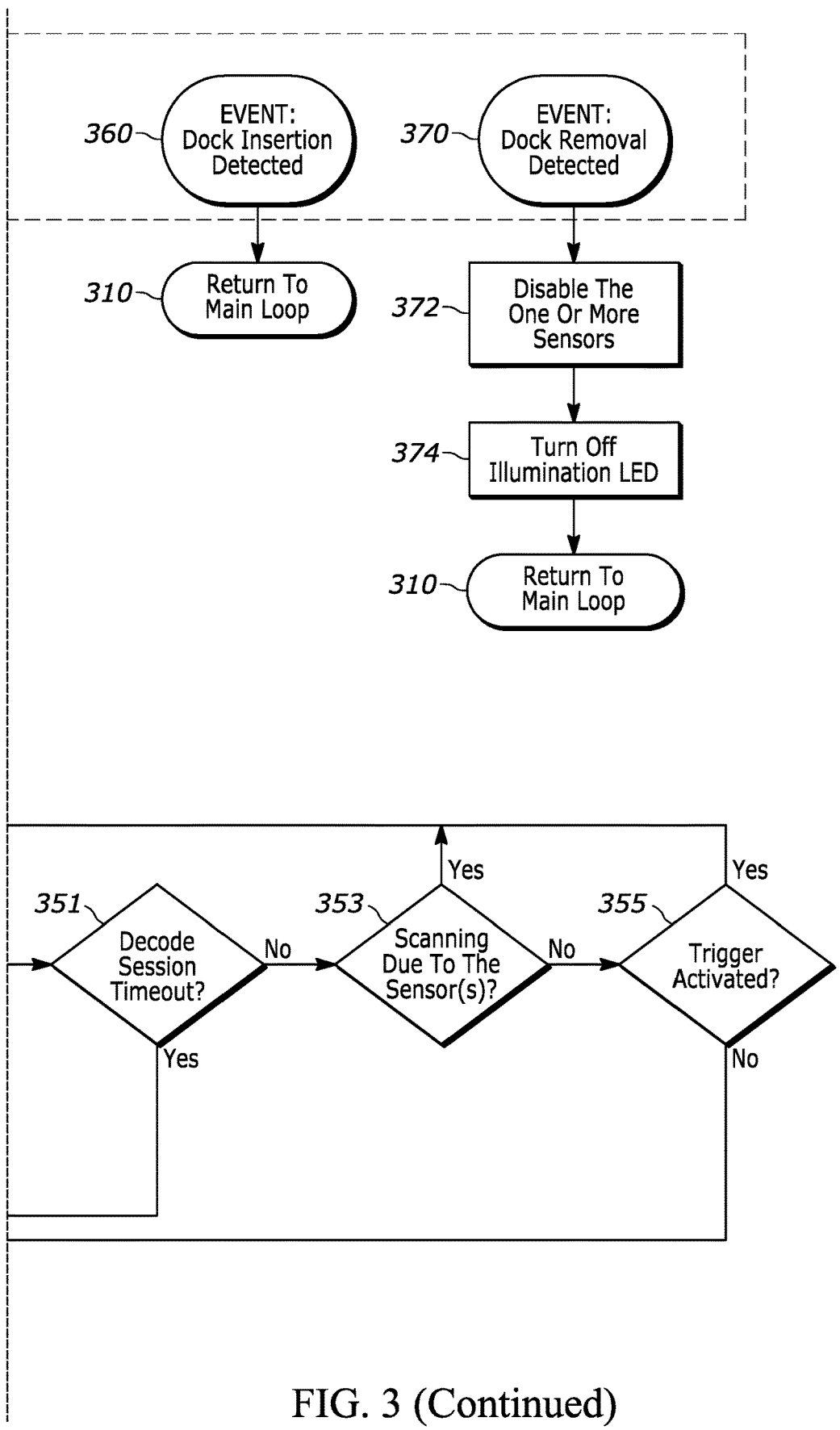

FIG. 3 is a flow diagram of an example implementation 300 of the improved lamp mode of the imaging device. The implementation 300 may be performed by any of the devices and systems described herein. For clarity, the implementation 300 will be described with reference to the imaging device 100 of FIGS. 1A and 1B and the system 200 of FIG. 2.

The implementation 300 may begin with a power on reset of the imaging device 100 (block 302) either switching "ON" the imaging device 100 and/or resetting the imaging device 100. Once the imaging device 100 is either switched "ON" or reset, electrical current may flow through the electronic circuitry of the imaging device 100, and the lamp mode setting of the imaging device 100 may be set to "OFF" (block 304). The one or more sensors of the imaging device 100 may then be disabled (block 306). In some embodiments, the lamp mode of the imaging device 100 may be set via a mechanical input device such as a switch. In these embodiments, if the lamp mode is set to "ON," then the implementation 300 will skip block 302 and proceed to block 306. The imaging device 100 may then enter the "Main Loop" of operation (block 310).

In the main loop, the imaging device 100 may check if the imaging device 100 is docked in a presentation cradle (block 311). If the imaging device 100 is docked in the presentation cradle (block 311), the imaging device 100 may enable the one or more sensors (e.g., the proximity sensor 212) (block 312). If the imaging device 100 is not docked in the presentation cradle (block 311), the imaging device 100 will wait for a triggering event (block 320). In some embodiments, the imaging device 100 may be able to enable the one or more sensors without being docked in a presentation cradle, in which case the implementation 300 will skip block 311 and proceed to block 312. The imaging device 100 may then check to determine if lamp mode has been enabled (block 313). If the lamp mode has been enabled (block 313), then the imaging device 100 will increase the activation duration of the illumination source by either (1) drive the illumination source at a constant current (e.g., 75 mA), (2) increase the duty cycle across the illumination source, or (3) increase the number of activations of the illumination source (block 314). Then the imaging device 100 will wait for a triggering event (block 320). If the lamp mode has not been enabled (block 313), then the imaging device 100 will turn off the illumination source. Once the illumination source has been turned off, the imaging device 100 will wait for a triggering event (block 320).

If, while waiting for a triggering event (block 320), the lamp mode switched "ON" while previously set to "OFF" (block 330), the imaging device 100 may switch "ON" the lamp mode (block 332). Similarly, if, while waiting for a triggering event (block 320), the lamp mode switched "OFF" while previously set to "ON" (block 330), the imaging device 100 may switch "OFF" the lamp mode (block 332). The imaging device 100 may then return to the main loop (block 310).

If, while waiting for a triggering event (block 320), the imaging device 100 enters scan mode (e.g., by detecting an object via the proximity sensor 212 or by a user depressing the trigger 102 of the imaging device 100), the imaging device 100 may disable the one or more sensors (block 342) and begin capturing an image via the one or more image sensors 214 (block 344). The imaging device 100 may drive a high current (e.g., 750 mA) through the illumination source at the frame rate (e.g., every 16.67 ms) of the imaging sensor 214 (block 346). The imaging sensor 214 may then capture an image and the one or more processors 202 may enter into a decoding session to decode indicia found within the captured image (block 348). If the indicia has been decoded (block 349), the imaging device 100 may transmit the decoded indicia data to a host device (block 356), re-enable the one or more sensors (block 358), and then return to the main loop (block 310). If the indicia has not been decoded (block 349), then the imaging device 100 may check to determine if the decoding session has timed out (block 351). If the decoding session has timed out (block 351), then the imaging device 100 may proceed to block 358. If the decoding session has not timed out (block 351), then the imaging device 100 may determine if the scan mode was activated due a triggering of the one or more sensors (block 353). If the imaging device 100 had entered the scan mode due to a triggering of the one or more sensors (block 353), then the imaging device 100 may return to block 348 to continue attempting to decode the indicia until the decode session times out (block 351). If the imaging device 100 has entered the scan mode due to a user depressing the mechanical trigger 102 of the imaging device 100, then the imaging device 100 may check to determine if the user is still depressing the mechanical trigger 102 (block 355). If the user is still depressing the mechanical trigger 102 (block 355), then the imaging device 100 may return to block to block 348 to continue attempting to decode the indicia until the decode session times out (block 351). If the user is no longer depressing the mechanical trigger 102 (block 355), then the imaging device 100 may proceed to block 358.

In some embodiments, a triggering event may be docking the imaging device 100 into a presentation cradle (block 360). In these embodiments, the imaging device 100 may proceed to the main loop (block 310).

In some embodiments, a triggering event may be removing the imaging device 100 from a presentation cradle (block 370). In these embodiments, the imaging device 100 may disable the one or more sensors (block 372), turn off the illumination source (block 374), and then proceed to the main loop (block 310).

The example implementation 300 may have more or less or different steps and/or may be performed in a different sequence.

Figure 4C:
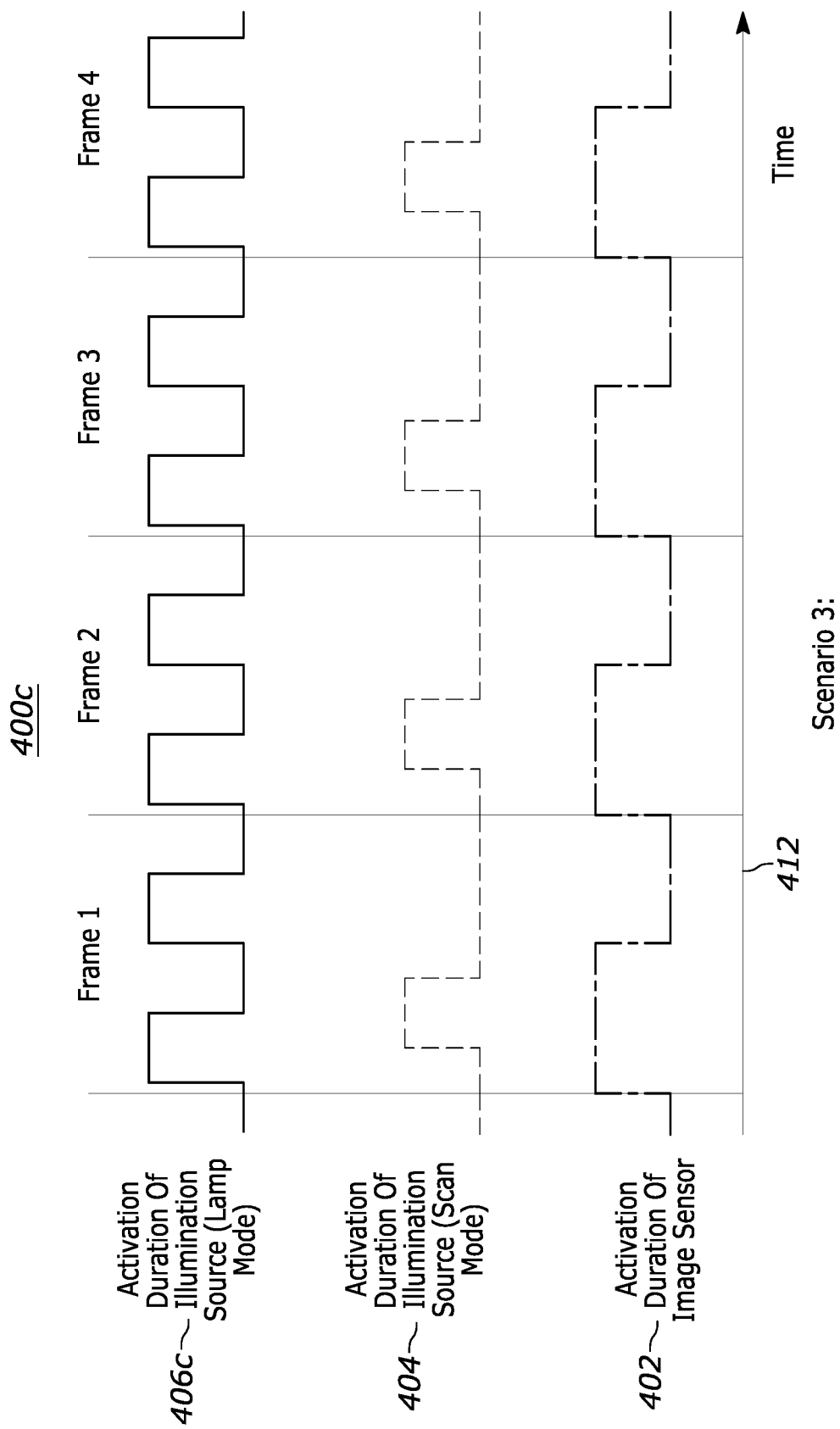
FIG. 4C is a graph of yet another example activation duration of an illumination source of the imaging device under an improved lamp mode.

FIGS. 4A-4C depict graphs 400a-400c of respective example activation durations of the illumination source(s) 216 of the imaging device 100 under the improved lamp mode, in accordance with different examples herein. As a point of comparison, the graphs 400a-400c illustrate the activation duration of the imaging sensor(s) 214 while actively scanning 402 across the frame rate 412 (e.g., every 16.67 ms) as well as the activation duration of the illumination source(s) 216 in scan mode 404 across the frame rate 412. As the graphs 400a-400c show, the illumination source(s) 216 flash briefly while being synchronized to the activation of the imaging sensor(s) 214.

FIG. 4A illustrates a first scenario wherein the illumination source(s) 216 are driven at a constant current (e.g., at 75 mA) while the imaging device 100 is in lamp mode 406a. In this scenario, the current across the illumination source(s) 216 while in lamp mode is significantly lower than while the illumination source(s) 216 are active while in scan mode. For example, the current across the illumination source(s) 216 while in scan mode may be about 750 mA and the current across the illumination source(s) 216 while in scan mode may be about 75 mA. This drop in current is to both (1) reduce the level of perceived brightness of the illumination source(s) 216 while in lamp mode and to make it appear to the user as about the same level of brightness as while the illumination source(s) 216 is in scan mode, and (2) to increase energy efficiency of the imaging device 100 while in lamp mode.

FIG. 4B illustrates a second scenario wherein the illumination source(s) 216 a higher duty cycle while the imaging device 100 is in lamp mode than when the imaging device 100 is in scan mode 406b. In this scenario, the duty cycle across the illumination source(s) 216 while in lamp mode is greater than while the illumination source(s) 216 are in scan mode. For example, the duty cycle across the illumination source(s) 216 while in lamp mode may be increased by about 10% than when the illumination source(s) 216 are in scan mode. This increase in the duty cycle is to reduce the level of perceived strobe effect of the illumination source(s) 216 while in lamp mode. Additionally, either the current, voltage, or power level across the illumination source(s) 216 may be reduced while the illumination source(s) 216 are in lamp mode. This reduction in current, voltage, or power is to both (1) reduce the level of perceived brightness of the illumination source while in lamp mode and to make it appear to the user as about the same level of brightness as while the illumination source(s) 216 is in scan mode, and (2) to increase energy efficiency of the imaging device 100 while in lamp mode.

FIG. 4C illustrates a third scenario wherein the illumination source(s) 216 activate a greater number of times while the imaging device 100 is in lamp mode than when the imaging device 100 is in scan mode 406c. In this scenario, the number of activations of the illumination source(s) 216 while in lamp mode is greater than while the illumination source(s) 216 are in scan mode. For example, the illumination source(s) 216 while in lamp mode may be activate 2-4 times at a regular periodic interval as opposed to the single activation the illumination source(s) 216 while in scan mode. Additionally or alternatively, in some embodiments, the illumination source(s) 216 while in lamp mode may be activated dozens of times per frame in an even shorter, regular periodic interval. These increases in the number of activations are to reduce the level of perceived strobe effect of the illumination source(s) 216 while in lamp mode. Additionally, either the current, voltage, or power level across the illumination source(s) 216 may be reduced while the illumination source(s) 216 are in lamp mode. This reduction in current, voltage, or power is to both (1) reduce the level of perceived brightness of the illumination source while in lamp mode and to make it appear to the user as about the same level of brightness as while the illumination source(s) 216 is in scan mode, and (2) to increase energy efficiency of the imaging device 100 while in lamp mode.

It should be appreciated that while only these three scenarios are illustrated in the graphs 400a-400c, other alternative scenarios for achieving similar results of the illumination source(s) 216 while in lamp mode are contemplated.

Figure 5:
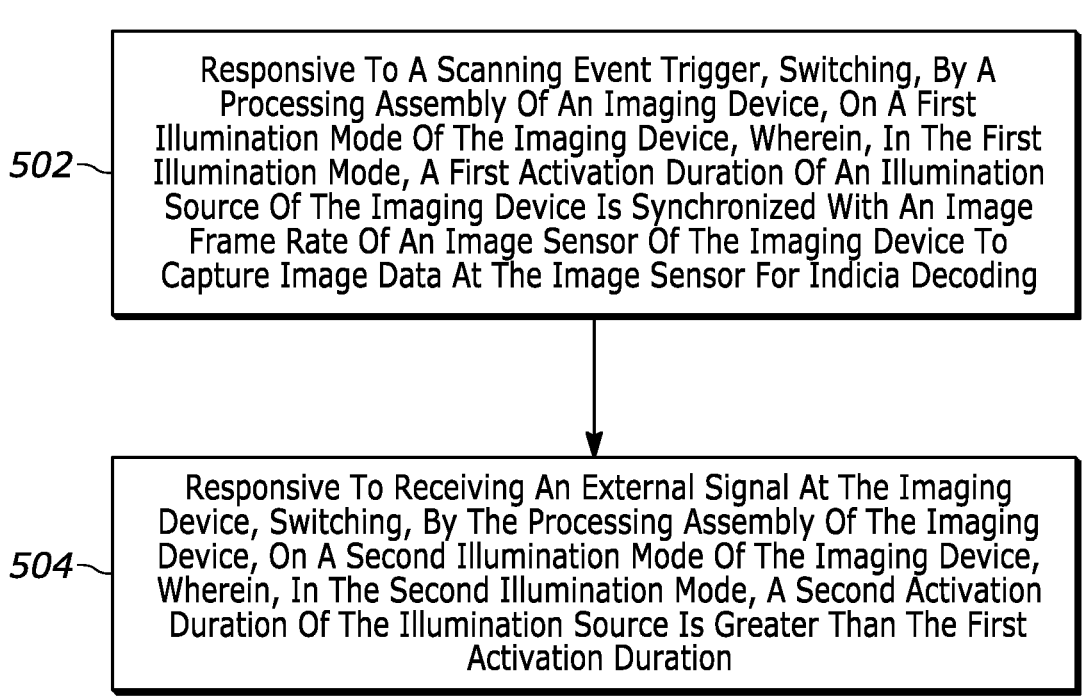
FIG. 5 illustrates an example method of an improved lamp mode of the imaging device.

FIG. 5 is a block diagram of an example flowchart for an example method and/or operation 500 described herein. The method and/or operation 500 may employ any of the components, apparatuses, devices, and/or systems described herein with respect to any of the foregoing figures.

The method and/or operation 500 may begin at block 502 by, responsive to a scanning event trigger, switching, by a processing assembly (e.g., the one or more processors 202) of an imaging device (e.g., the imaging device 100), on a first illumination mode (e.g., the scan mode described herein) of the imaging device, wherein, in the first illumination mode, a first activation duration of an illumination source (e.g., the illumination source(s) 216) of the imaging device is synchronized with an image frame rate of an image sensor (e.g., the image sensor(s) 214) to capture image data at the image sensor for indicia decoding.

In some embodiments, the scanning event trigger may be the triggering of one or more sensors (e.g., the detection of an object by the proximity sensor 212) and/or the activation of a mechanical trigger of the imaging device (e.g., the user depressing the mechanical trigger). In the embodiments where the second illumination mode was already turned on when the scanning event triggers the first illumination mode, the first illumination mode may suspend the second illumination mode to capture the image and decode any indicia therein. Once the imaging device has decoded the indicia, failed to find an indicia in the captured image, or timed out a decoding session—or in the embodiments where the scanning event trigger was the activation of the mechanical trigger—the imaging device may return to the mode it was previously in prior to setting on the first illumination mode. For instance, if the imaging device was in the second illumination mode prior to setting on the first illumination mode, the imaging device will return to the second illumination mode. Similarly, if the second illumination mode was not on when the imaging device turned on the first illumination mode, the second illumination mode will remain off when the imaging device turns off the first illumination mode.

The method and/or operation 500 may proceed to block 504 by, responsive to receiving an external signal at the imaging device, switching, by the processing assembly of the imaging device, on a second illumination mode (e.g., the improved lamp mode described herein) of the imaging device, wherein, in the second illumination mode, a second activation duration of the illumination source the imaging device is greater than the first activation duration.

In some embodiments, the external signal may be engaging a mechanical input device (e.g., the mechanical input component 112) and/or the detection of an acceleration that exceeds a threshold acceleration by an accelerometer of the imaging device (e.g., the accelerometer 206). In some embodiments, the second illumination mode may be switched "ON" and/or "OFF" based upon a determination made by a machine learning model (a "ML model" or an "AI model"). In these embodiments, the ML model may be trained and verified using a set of training data that includes a set of correlations between accelerations and determinations. For instance, patterns in the training data may reveal a pattern between acceleration and determinations (e.g., two quick jerks in succession may be associated with switching the second illumination mode "ON" and/or "OFF" and an acceleration with a fairly small derivative may be associated with not switching the second illumination mode "ON" and/or "OFF") such that the model may be able to make an accurate determinations on new accelerations not found in the training data. Once the ML model has been trained and verified, it may be deployed on the one or more processors, and the detected acceleration from the accelerometer may be used as an input for the ML model. The ML model may then make, as an output, a determination to either switch "ON" and/or "OFF" the lamp mode.

In some embodiments, second activation duration may be one of or include: (1) a constant duration, (2) a greater duty cycle than the first activation duration, (3) a great number of activations than the number of activations in the first activation duration. When the second activation duration has a constant duration, a constant current is driven across the illumination source(s) 216. When the second activation duration has a greater duty cycle than the first activation duration, the illumination source(s) 216 may emit a visible light for a longer duration to minimize or eliminate the noticeable strobing effect. When the second duration has a great number of activations than the number of activations in the first activation duration, the illumination source(s) 216 may be flickering so fast that a human cannot perceive the strobing effect. In all of these cases, the illumination source(s) 216 may be dimmed by reducing (1) the current, (2) the voltage, or (3) the power across the illumination source(s) 216. Dimming the illumination source(s) 216 in this way will keep the level of perceived brightness consistent with when the illumination source(s) are used in the first illumination mode and increase energy efficiency.

The method and/or operation 500 may have more or less or different steps and/or may be performed in a different sequence.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Alternative implementations of the examples represented by the block diagram of the system 200 of FIG. 2 includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. An imaging device comprising:
an image sensor;
an illumination source; and
a processing assembly communicatively coupled to the image sensor and the illumination source, and the processing assembly is configured to:
responsive to a scanning event trigger, cause the imaging device to enter a first illumination mode, wherein, in the first illumination mode, a first activation duration of the illumination source is synchronized with an image frame rate of the image sensor to capture image data at the image sensor for indicia decoding; and
responsive to sensing an external signal at the imaging device, cause the imaging device to enter or exit a second illumination mode, wherein, in the second illumination mode, a second activation duration of the illumination source is greater than the first activation duration.

2. The imaging device of claim 1, wherein the second activation duration is a constant duration.

3. The imaging device of claim 1, wherein the second activation duration has a greater duty cycle than the first activation duration.

4. The imaging device of claim 1, wherein the second activation duration has a greater number of activations than the first activation duration.

5. The imaging device of claim 1, wherein visible light emitted from the illumination source during the second activation duration is dimmer than during the first activation duration.

6. The imaging device of claim 1, the imaging device further comprising:
a mechanical trigger with a pressure sensor communicatively coupled to the processing assembly, and
wherein:
the scanning event trigger is a user pressing on the mechanical trigger to engage the pressure sensor, and
the imaging device remains in the first illumination mode until (i) the imaging device decodes an indicia in image data captured by the image sensor or (ii) the user releases the mechanical trigger.

7. The imaging device of claim 1, the imaging device further comprising:
a proximity sensor communicatively coupled to the processing assembly, and
wherein:
the scanning event trigger is a detection of an object by the proximity sensor, and
the imaging device remains in the first illumination mode until (i) the imaging device decodes an indicia in image data captured by the image sensor or (ii) the proximity sensor no longer detects the object.

8. The imaging device of claim 1, the imaging device further comprising:
a mechanical input component, and
wherein:
the mechanical input component is one of (a) a switch, (b) a button, or (c) a dial, and
the external signal is a user engaging the mechanical input component.

9. The imaging device of claim 1, the imaging device further comprising:
an accelerometer, and
wherein:
the accelerometer is communicatively coupled to the processing assembly, and
the external signal is an acceleration detected by the accelerometer that exceeds a threshold acceleration.

10. The imaging device of claim 1, the imaging device further comprising:
an accelerometer; and
a machine learning model, and
wherein:
the accelerometer is communicatively coupled to the processing assembly,
the machine learning model is executed by the processing assembly for outputting a determination of whether the imaging device should enter or exit the second illumination mode based on a detected acceleration of the imaging device,
the machine learning model is trained on a plurality of training accelerations,
an acceleration detected by the accelerometer is input into the machine learning model,
a determination to enter or exit the second illumination mode is outputted by the machine learning model, and
the external signal is the determination.

11. A computer-readable method comprising:
responsive to a scanning event trigger, switching, by a processing assembly of an imaging device, on a first illumination mode of the imaging device, wherein, in the first illumination mode, a first activation duration of an illumination source of the imaging device is synchronized with an image frame rate of an image sensor of the imaging device to capture image data at the image sensor for indicia decoding; and
responsive to receiving an external signal at the imaging device, switching, by the processing assembly of the imaging device, on a second illumination mode of the imaging device, wherein, in the second illumination mode, a second activation duration of the illumination source is greater than the first activation duration.

12. The computer-readable method of claim 11, wherein the second activation duration is a constant duration.

13. The computer-readable method of claim 11, wherein the second activation duration has a greater duty cycle than the first activation duration.

14. The computer-readable method of claim 11, wherein the second activation duration has a greater number of activations than the first activation duration.

15. The computer-readable method of claim 11, wherein visible light emitted from the illumination source during the second activation duration is dimmer than during the first activation duration.

16. The computer-readable method of claim 11, wherein:
the scanning event trigger is a user pressing on a mechanical trigger of the imaging device to engage a pressure sensor, and
the imaging device remains in the first illumination mode until (i) the imaging device decodes an indicia in image data captured by the image sensor or (ii) the user releases the mechanical trigger.

17. The computer-readable method of claim 11, wherein:
the scanning event trigger is a detection of an object by a proximity sensor of the imaging device, and
the imaging device remains in the first illumination mode until (i) the imaging device decodes an indicia in image data captured by the image sensor or (ii) the proximity sensor no longer detects the object.

18. The computer-readable method of claim 11, wherein:
the external signal is a user engaging a mechanical input component of the imaging device, and
the mechanical input component is one of (a) a switch, (b) a button, or (c) a dial.

19. The computer-readable method of claim 11, wherein:
the external signal is a detection, by an accelerometer of the imaging device, of an acceleration that exceeds a threshold acceleration.

20. The computer-readable method of claim 11, further comprising:
training, by one or more processors, a machine learning model deployed on the imaging device, the machine learning model trained to output a determination of whether the imaging device should switch on the second illumination mode of the imaging device based on a detected acceleration of the imaging device;
detecting, by an accelerometer of the imaging device, an acceleration of the imaging device;
inputting, by the processing assembly of the imaging device, the detected acceleration into the machine learning model; and
outputting, by the machine learning model, a determination to switch on the second illumination mode of the imaging device, wherein the external signal is determination.

* * * * *